US006596785B2

(12) United States Patent
Free

(10) Patent No.: US 6,596,785 B2
(45) Date of Patent: *Jul. 22, 2003

(54) INK RETAINING FOAM STRUCTURE

(75) Inventor: Sharon A. Free, Wallingford, PA (US)

(73) Assignee: Foamex L.P., Linwood, PA (US)

( * ) Notice: Subject to any disclaimer, the term of this patent is extended or adjusted under 35 U.S.C. 154(b) by 13 days.

This patent is subject to a terminal disclaimer.

(21) Appl. No.: 09/906,981

(22) Filed: Jul. 17, 2001

(65) Prior Publication Data
US 2003/0018093 A1 Jan. 23, 2003

(51) Int. Cl.[7] ............................................... C08G 18/10
(52) U.S. Cl. ......................... 521/174; 521/52; 347/86
(58) Field of Search ..................... 521/52, 174; 347/86

(56) References Cited

U.S. PATENT DOCUMENTS

| 4,306,245 | A |   | 12/1981 | Kasugayama et al. |
|-----------|---|---|---------|-------------------|
| 4,771,295 | A |   | 9/1988  | Baker et al. |
| 4,794,127 | A |   | 12/1988 | Knobel et al. |
| 4,794,409 | A |   | 12/1988 | Cowger et al. |
| 4,929,969 | A |   | 5/1990  | Morris |
| 4,985,467 | A | * | 1/1991  | Kelly et al. ............... 521/109.1 |
| 5,042,978 | A |   | 8/1991  | Quenin et al. |
| 5,182,579 | A |   | 1/1993  | Haruta et al. |
| 5,233,369 | A |   | 8/1993  | Carlotta et al. |
| 5,317,339 | A |   | 5/1994  | Braun et al. |
| 5,358,984 | A |   | 10/1994 | Hayes et al. |
| 5,448,275 | A |   | 9/1995  | Fong |
| 5,467,117 | A |   | 11/1995 | Evans et al. |
| 5,477,255 | A |   | 12/1995 | Huth |
| 5,486,855 | A |   | 1/1996  | Carlotta et al. |
| 5,491,501 | A |   | 2/1996  | Dietl et al. |
| 5,501,725 | A |   | 3/1996  | Lauw et al. |
| 5,519,425 | A |   | 5/1996  | Dietl et al. |
| 5,587,731 | A |   | 12/1996 | Yasunaga et al. |
| 5,631,682 | A |   | 5/1997  | Takata |
| 5,652,610 | A |   | 7/1997  | Kawai et al. |
| 5,657,065 | A |   | 8/1997  | Lin |
| 5,659,345 | A |   | 8/1997  | Altendorf |
| 5,680,164 | A |   | 10/1997 | Miller et al. |
| 5,925,687 | A | * | 7/1999  | Guettes et al. .......... 252/182.24 |
| 6,102,532 | A |   | 8/2000  | Horinouchi |
| 6,371,606 | B1 | * | 4/2002 | Free .............................. 347/86 |

FOREIGN PATENT DOCUMENTS

| EP | 0 661 159 | 7/1995 |
| EP | 0 832 750 | 4/1998 |
| JP | 11 020192 | 1/1999 |
| JP | 11 187462 | 7/2001 |
| WO | 02 32675  | 4/2002 |

* cited by examiner

Primary Examiner—John M. Cooney, Jr.
(74) Attorney, Agent, or Firm—Connolly Bove Lodge & Hutz LLP

(57) ABSTRACT

An ink retaining flexible polyurethane foam is prepared by reacting a polyether polyol with from 50 to 80 parts by weight, based on the weight of polyol, of a polyisocyanate component having one or a mixture of methylene diisocyanates. The foam has pore sizes above 70 pores per linear inch, preferably in the range of 70 to 90 pores per linear inch in an uncompressed state. The foam is reticulated to improve liquid holding capacity, and, depending upon cell size, compressed into a container. The foam absorbs and retains ink, and is resistant against attack from ink, producing less than 2.0% solvent extractables.

10 Claims, 1 Drawing Sheet

INK RETAINING FOAM STRUCTURE

BACKGROUND OF THE INVENTION

In the art of thermal ink jet printing, various multi-cellular materials have been used to store and deliver ink to a printing head. Included among these materials are conventional polyether polyurethane foams, reticulated cellulose, polyethylene foams and melamine-formaldehyde condensate foams. See U.S. Pat. No. 4,771,295; 4,794,409; 4,306,245 and 4,929,969.

U.S. Pat. No. 4,771,295 discloses a thermal ink jet pen body that includes a controlled pore-size reticulated polyether polyurethane foam. Reticulation breaks the walls of the small membranes within the foam material creating more passages through which liquids, such as ink, may flow. Prior to insertion into the pen body, the foam is compressed to reduce the pore size and increase the foam density, thus better controlling the capillarity of the foam. The '295 patent does not disclose particular foam compositions and does not consider potential contamination of the ink by materials extracted from the foam when the ink is held in contact with the foam for extended periods of time.

U.S. Pat. No. 5,182,579 discloses an inkjet container filled with a compressed polyurethane foam ink absorbent member. The patent notes problems caused by impurities that may be extracted from the foam and contaminate the ink. When more than 0.04% by weight per gram of ink of the impurities are present in the ink, the surface tension and other properties of the ink are affected adversely. To solve such problems, the '579 patent proposes washing the foam with an organic polar solvent to extract the impurities from the foam before inserting the foam into an ink jet printer.

U.S. Pat. No. 5,491,501 discloses an ink delivery medium formed from a high density, fine pore, open cell polyester polyurethane foam. The patent states that prior melamine foams emit dust that can clog the ink channel, such that melamine foams must be pre-cleaned and used in conjunction with a fine filter. The patent also states that particles break away from the prior polyurethane foams when such foams are reticulated, and that these particles must be removed from the foams with a pre-cleaning step before these foams can be used in an ink jet printer. In addition, the patent notes that most foaming processes use surfactants, and that excess surfactants must be removed from the foams with a pre-cleaning step before the foams can be used in ink jet applications. Unlike the prior melamine foams, reticulated foams and foams formed using surfactants, the particular foam disclosed in the '501 patent is stated to be made without surfactants so that it is substantially free of residual foaming surfactants and loose particles. As a result, pre-cleaning is not required.

U.S. Pat. No. 5,587,731 discloses ink retainers made with compressed, preferably reticulated, flexible polyurethane foams with cell sizes above 20 cells/inch prepared with a polymeric polyol having styrene and/or acrylonitrile grafted thereto. Using at least 20% by weight of the polymeric polyol is said to reduce the swelling of the foam when the foam is in contact with solvents present in the ink, which in turn prevents organic matter in the foam from leaching into the ink.

The prior art ink retainers made with polyurethane foams formed with conventional polyols and surfactants emit extractable material, such as low-molecular urethane, excess unreacted surfactants, excess catalysts, antioxidants and plasticizers, when in contact with ink solvents. These extractable materials and particles can leach into the ink or ink solvent and either contaminate the ink with particles that may clog the pen, or change the surface tension of the ink and the resulting print quality. The industry is searching for less expensive foams that can be used as ink retainers in conjunction with ink jet printers without significant pre-cleaning to remove extractable materials. Accordingly, one object of the present invention is to produce polyurethane foams that emit significantly less extractable materials.

SUMMARY OF THE INVENTION

According to the invention, an ink retainer suitable for use inside an ink container for an ink jet printing system is formed from a polyether polyurethane foam that is stable to retain and supply ink and produces very low solvent extractables, less than 2.0%, preferably less than 1.5%, most preferably less than 1.1%. The foam is prepared by reacting a polyether polyol with from about 50 to 80 parts by weight, based on 100 parts polyol, of a polyisocyanate component. The polyisocyanate component is one or a mixture of polymeric methylene diphenyl diisocyanates, wherein the functionality is from 2.1 to 2.5 and the % NCO is from 28 to 32%. The isocyanate index is in the range from about 103 to 120, preferably 105 to 115. The polymeric methylene diphenyl isocyanates preferably are mixtures of the 4, 4' isomer, the 2, 4' isomer, and/or the 2, 2' isomer of methylene diisocyanate and higher molecular weight oligomers. Some toluene diisocyanate may be incorporated into the polyisocyanate component, but preferably in an amount not exceeding 17 percent by weight, based on the weight of the polyol.

The polyurethane foam so produced has foam pore sizes above 70 pores per linear inch, preferably in the range of 70 to 90 pores per linear inch (measured by pressure drop techniques). The foam is reticulated, preferably by thermal reticulation, to remove substantially all foam cell membranes. The foam may also be felted, i.e., compressed between heated plates until the foam has a permanent compression set. When placed in a container for ink, the foam may be compressed at a compression ratio by volume of from 1 to 2 up to from 1 to 20. When the foam has smaller pore sizes, a lower compression ratio by volume is used, preferably 1 to 2 to 1 to 5.

Foam densities for polyurethane foams according to the invention are generally from 1.2 to 3.0 pounds per cubic foot, preferably 1.2 to 2.0 pounds per cubic foot. Higher or lower densities may also be suitable so long as the foam is stable to retain and supply ink and emits low extractables.

DESCRIPTION OF THE PREFERRED EMBODIMENT

Figure 1:
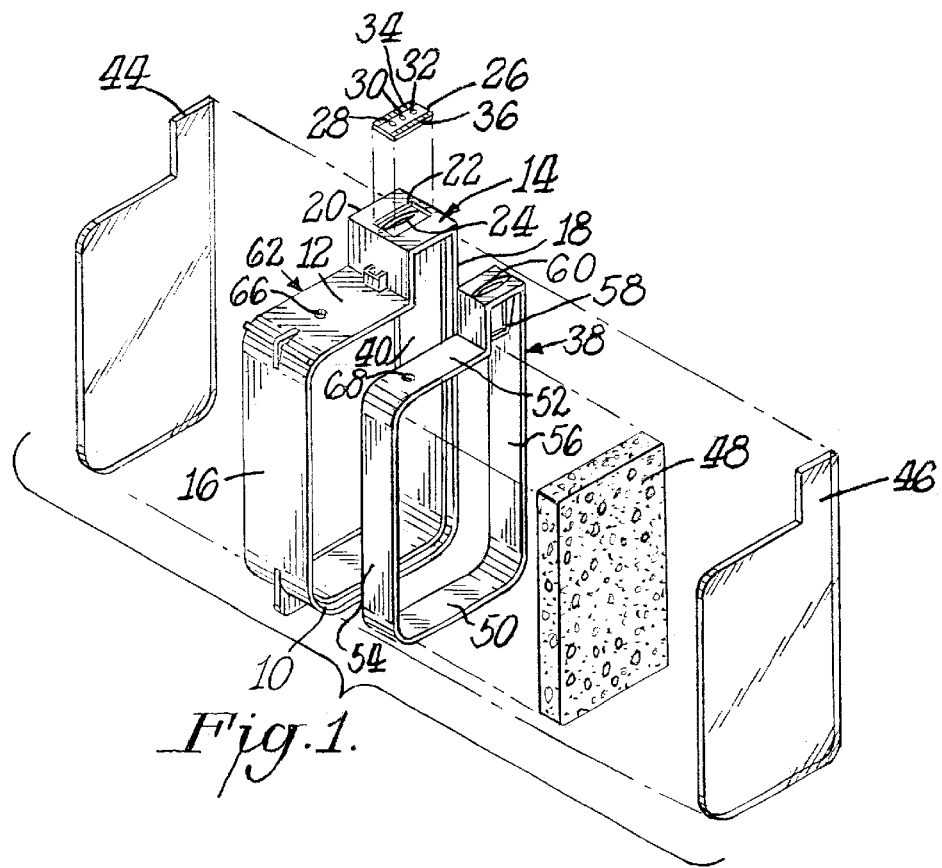
FIG. 1 is an exploded perspective view showing the various components of a thermal ink jet pen that includes a foam ink retainer.

Referring to FIG. 1, an example of one type of thermal ink jet pen body construction is shown in an exploded perspective view. The Figure is reproduced from U.S. Pat. No. 5,448,275. The pen body has a main unitary housing 14 with top and bottom walls 10 and 12. The main unitary housing 14 further includes vertical side walls 16 and 18. The main unitary housing 14 also includes an ink delivery and printhead support section 20 having a rectangular receptacle 22 that includes a centralized opening 24 for receiving a thin film printhead 26. The thin film printhead 26 typically includes a plurality of output ink injection orifice arrays 28, 30 and 32. A plurality of electrical connection tabs 34 and 36 are provided on each side of the thin film printhead 26.

A structurally reinforcing frame or rib member 38 of matching but slightly smaller geometry and configuration is adapted for mounting within the interior mating walls 40 of the larger unitary pen body housing or frame member 14. The interior frame member 38reinforces the complete pen body housing and adds thickness to which thin, flexible plastic exterior walls 44 and 46 may be heat staked or bonded.

A rectangular block of foam forming the ink retainer 48 is inserted into the region confined by the top and bottom walls 50 and 52 of the interior reinforcing frame member 38, the side walls 54 and 56 thereof and also by a small interior rib member 58 within the ink delivery section 60 of the interior of the frame member 38. The exterior geometry of the ink delivery section 60 matches the interior geometry of the ink delivery section 20 of the main unitary housing and frame member 14 of the pen.

Once the foam block 48 has been inserted in place within the confines of the interior reinforcement frame member 38, the thin, flexible plastic walls 44 and 46 are brought into contact with the edges of the internal frame member 38. The flexible side walls 44 and 46 are then fused into completely sealed contact with the frame member, preferably using a heat staking process at controlled elevated temperatures and pressures known to those skilled in the art of plastics and heat staking processes.

After the plastic side walls 44 and 46 are heat staked in place to completely seal off the block of foam 48 within the pen body, the thin film thermal ink jet printhead 26 is thermo-compression bonded into the mating rectangular receptacle 22 in the ink delivery section 20 of the pen. During a printing operation, the ink will be drawn through the oblong opening 24 in the center of the receptacle 22 and then through ink passageways internal to the printhead 26 and out of the orifices 28, 30 and 32. The ink ejection operation is accomplished by electrically pulsing heater resistors (not shown) inside the thermal ink jet printhead 26. The pulses are applied through the contact tabs 34 and 36 on the printhead 26.

Figure 2:
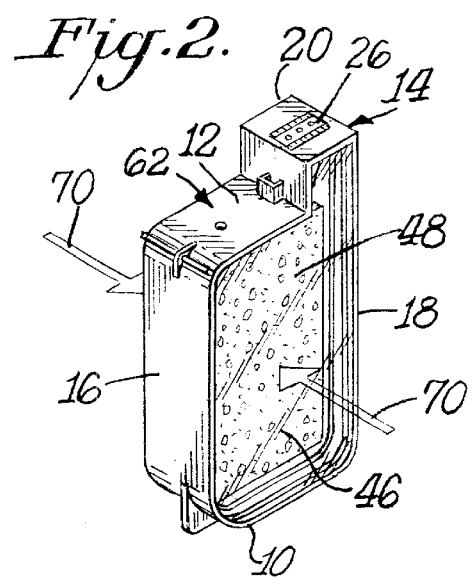
FIG. 2 is a perspective view of the thermal ink jet pen as assembled.

Once the thermal ink jet pen body is assembled, as shown in FIG. 2, the pen may be filled with ink. An ink fill spout 62 is provided through an opening 66 in the outer unitary frame and housing 14 and a mating opening 68 in the interior reinforcing frame 38. The spout 62 is adapted to receive an insertion tube from a source of ink supply (not shown). Ink is held within the pen body and within the pores of the foam block ink retainer 48.

Once filled with ink, the pen is positioned in a preferably vertical orientation and inserted into the pen carriage of a thermal ink jet printer and electrically connected to the pen driving circuitry through the contacts 34 and 36 on each side of the thin film printhead 26. Ink is pulled through the output orifice arrays 28, 30 and 32 and a negative backpressure produces the collapsing forces indicated by the arrows 70 in FIG. 2. This negative backpressure starts collapsing the plastic flexible side walls 44 and 46 into depressing contact with the block of foam 48 within the pen body. As ink continues to be drawn out of the thermal ink jet pen, the negative backpressure will continue to increase and depress/compress the block of foam 48 until an equilibrium condition is reached between the force of the collapsing flexible plastic walls 44 and 46 and the repelling force exerted by the block of foam 48.

The thermal ink jet pen shown in FIGS. 1 and 2 is one example of a pen in which the polyurethane foam ink retainer according to the invention may be used. Ink jet printer pens may be configured differently, and may be provided with more than one foam ink retainer. The invention is not intended to be limited to use with only one type of ink jet printer pen.

The polyether polyurethane foam which constitutes an ink retainer according to the present invention is prepared by reacting a polyether polyol with a polyisocyanate in the presence of a catalyst, a blowing agent, a foam stablizer and other foaming aids.

The polyether polyols have an average molecular weight of about 3,000–3,500 (i.e., number average molecular weight measured by gel permeation chromatography). Examples of these polyols are Voranol 3010 from Dow Chemical (having a reported molecular weight of about 3000±100, which is determined by a formula which corresponds well to number average molecular weight measured by gel permeation chromatography) and Pluracol 1103 from BASF (having a reported molecular weight measured of about 3100 which is determined by a formula which corresponds well to number average molecular weight measured by gel permeation chromatography). The following paragraph provides a more detailed description of these polyols but is not intended to be limiting.

The polyether polyol is polyoxypropylene polyether polyol or mixed poly(oxydethylene/oxypropylene) polyether polyol. Modified polyether polyols are those polyether polyols having a polymer of ethylenically unsaturated monomers dispersed therein. Representative modified polyether polyols include polyoxypropylene polyether polyol into which is dispersed poly(styrene acrylonitrile) or polyurea, and poly(oxyethylene/oxypropylene) polyether polyols into which is dispersed poly(styrene acrylonitrile), or polyurea. Modified polyether polyols are commercially available from several companies, including Arco, now Bayer (supplied as "Polymer Polyol" or "PHD Polyol"), BASF (supplied as "Graft Polyol"), and Dow Chemical (supplied as "Co-polymer Polyol). Bayer ("Polymer Polyol"), BASF, and Dow disperse poly(styrene acrylonitrile) into the polyol, whereas Bayer ("PHD Polyol") disperses polyurea therein.

The polyisocyanates include aromatic and aliphatic polyisocyanates each containing at least two isocyanate groups in a molecule, and modified products thereof. The methylene diisocyanates suitable for use are diphenyl methane diisocyanate and polymethylene polyphenyl isocyanate blends (hereinafter sometimes referred to as "MDI" or "polymeric MDI"). The MDI blends can contain diphenylmethane 4,4' diisocyanate as well as the 2,2' and 2,4' isomers and higher molecular weight oligomers, and have an isocyanate functionality of from about 2.1–2.7, preferably from about 2.1–2.5. As used herein, the term "isocyanate functionality" means the molar average number of isocyanate groups per molecule of the blends.

Preferably, polymeric MDI comprises the only polyisocyanate used in the foaming mixture. However, a blend of isocyanates with MDI as the primary component may be used. When TDI (toluene diisocyanate) is present in the MDI blends, the amount of TDI that is present should be less than about 25% (based on isocyanate equivalents in the blend) or less than about 17% by weight, based on the weight of the polyol. Commercially available toluene diisocyanates generally constitute one of the following isomer blends: 80% 2, 4 toluene diisocyanate with 20% 2,6 toluene diisocyanate; or 65% 2,4 toluene diisocyanate with 35% 2,6 toluene diisocyanate.

The polyisocyanate component used is about 50 to 80 parts by weight per 100 parts by weight of the polyol component. In the preferred embodiment of the present invention, the isocyanate index of the foam forming mixture is from 102–120. In the most preferred embodiment of the present invention, the isocyanate index of the foam forming mixture is from about 105 to about 115.

Catalysts include amine catalysts, such as triethylenediamine, imidazoles and tin catalysts, such as stannous octoate. Catalysts are preferably present in amounts from 0.1 to 1.0 parts by weight for amine catalyst, and 0 to 0.5 parts by weight for tin catalyst, based on 100 parts by weight of the polyol component. Other catalysts may be included in the foam-forming mixture, such as gel catalysts often used as replacements for tin catalysts, including zinc octoate or potassium octoate. Preferably, catalysts are incorporated in a pure or concentrated form to avoid introducing carriers or reactive carriers into the foam-forming mixture, which carriers may leave undesirable residuals in the resulting foam structure.

Stablizers include silicone foam stabilizers, and may be present in amounts from 0.5 to 2.0 parts by weight, based on 100 parts by weight of the polyol component.

Water is added as a blowing agent, typically in an amount of about 1.0 to 5.0 parts by weight, per 100 parts by weight of the polyol component. Water is the preferred blowing agent, but auxiliary blowing agents may be introduced into the foam-forming mixture in some circumstances.

The components are concurrently introduced to a mixing head and mixed together to cause a foaming reaction. Extra air or carbon dioxide may be incorporated into the mixture at the mix head to control the foam cell diameter in the resulting foam. The mixture is then introduced into a mold or onto a moving conveyor. The foaming mixture is allowed to rise and cure. The cured foam has pore sizes above 70 pores per linear inch, preferably in the range of about 70 to 90 pores per inch.

The foam may then be reticulated, preferably by thermal reticulation such as by introducing the foam into a closed chamber with oxygen and hydrogen gasses and igniting the gases to cause an explosion. The explosion or flame breaks the cell membranes, but leaves the cell strands intact. Reticulation improves the liquid holding capacity of the foam.

Optionally, depending upon foam pore size, the foam is felted. A sheet of foam is compressed to a desired thickness between heated plates until a permanent set is achieved. Typically, the foam is under compression for ten to sixty minutes at temperatures from 350° F. to 360° F. A compression ratio less than 1 to 2 may not result in a uniform structure. Such felted foam may not be compressed evenly even though it may take a permanent set. Compression ratios preferably exceed 1 to 2, and range up to 1 to 20. Greater compression of felted foams is possible. When the foam has smaller pore sizes, compression ratios from 1 to 2 up to from 1 to 5 are preferred.

The resulting polyurethane foam is then cut to the desired size and shape and compressed into a container for ink. Depending upon manufacturing specifications for the printer, the ink retaining foam supplies ink to a printhead at a desired rate. The foam should not leak excess ink, and alternatively, should not exhibit ink "starvation" where insufficient ink is delivered. The significant manufacturing specifications are ink backpressure and foam felted compression ratio (firmness). Typically, the backpressures range from 2.0 to 6.0 inches of water.

It has surprisingly been found that the polyether polyurethane foams according to the invention, made with specific methylene diisocyanates, release fewer solvent extractables than conventional polyurethane foams. While not wishing to be bound by any one theory, it appears that the MDI reacts more completely with the polyol and that the resulting foam therefore contains less lower molecular weight urethanes than foams made with TDI. The lower molecular weight urethanes form part of the solvent extractable material in conventional TDI polyether polyurethane foams.

EXAMPLES

Table 1 sets out the components and the amounts used to prepare polyether polyurethane foams according to the invention (Example 1) and a conventional polyether polyurethane foam (Comparison A). The polyol component and other ingredients were mixed together first, then this mixture was introduced to a mixing head with the polyisocyanate(s). The mixture was poured onto a moving conveyor on a pilot plant scale, and allowed to rise and cure for 24 hours. Thereafter, the samples were thermally reticulated.

The foams used the same catalysts, but water levels were adjusted in an attempt to match the densities for the resulting TDI-based and MDI-based foams.

Samples of each of the example foams were felted to firmness 5.5, meaning that the compression ratio was 5.5 (the original sample thickness was 5.5 times that of the thickness of the compressed, felted foam).

The percent of solvent extractables (% NVR) was determined by placing a sample of foam with a known weight into a SOXHLET extractor. The solvent used for the extraction was isopropanol (IPA) (although other solvents, such as water, acetone, methanol, ethanol, methylene chloride, chloroform, and FREON, which do not degrade the foam may also be used). The SOXHLET extractor was refluxed until no further weight loss from the foam sample was observed. This generally took about three hours for each foam sample. (Longer reflux times may be required for different solvents.) The foam sample was removed from the extractor, dried and weighed to calculate a weight loss. The solvent was poured from the extractor into a container and evaporated. The residue remaining in the container is weighed to calculate the percent of non-volatile residues that were extracted from the foam sample. The % NVR is the ratio of the weight of the residues over the original foam weight, multiplied by 100.

TABLE 1

|  | Comparison A | 1 |
| --- | --- | --- |
| 3010 polyol | 100 | 100 |
| TD80 isocyanate | 34.5 | 0.0 |
| 2120 isocyanate | 0.0 | 70.1 |
| Water | 2.5 | 3.7 |
| L620 surfactant | 1.0 | 1.0 |
| NEM | 1.0 | 1.0 |
| C124 | 0.5 | 0.5 |
| C-2 | 0.15 | 0.12 |
| Index | 105 | 105 |
| Density | 2.4 | 2.2 |

TABLE 1-continued

|  | Comparison A | 1 |
|---|---|---|
| Unfelted | | |
| % weight loss | 1.40 | 1.02 |
| % NVR | 1.65 | 1.00 |
| Felted | | |
| % weight loss | 2.37 | 1.53 |
| % NVR | 2.28 | 1.28 |

3010 polyol was VORANOL 3010, a commercial polyol from Dow Chemical. TD80 is a commercial blend of 80% 2, 4 toluene diisocyanate and 20% of 2,6 toluene diisocyanate from Bayer AG. 2120 isocyanate is a 2, 4' functionality polymeric diphenyl methylene diisocyanate. L620 is a silicone surfactant from OSi. NEM is n-ethyl morpholine. C-2 is a stannous octoate catalyst from Crompton. C124 from OSi is a 10% bis (2-dimethylaminoethyl) ether with 90% dipropylene glycol carrier.

The foam according to the invention showed reduced solvent extractables and less weight loss when compared with a conventional polyether polyurethane foam. The unfelted Example 1 shows a 27% weight loss reduction and a 39% reduction in solvent extractables over the unfelted comparison Example A. Even greater improvement was seen for the felted Example 1.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

I claim:

1. An ink retainer comprising:
   a flexible polyurethane foam prepared by
   (a) reacting a polyether polyol with from about 50 to 80 parts by weight based on 100 parts polyol, of a polyisocyanate component, wherein the polyisocyanate component is selected from the group consisting of: diphenylmethane 4,4' diisocyanate, diphenylmethane 2,2' diisocyanate, diphenylmethane 2,4' diisocyanate and higher molecular weight oligomers, and mixtures thereof, and wherein the polyisocyanate component has an isocyanate functionality of from about 2.1–2.7, and
   (b) reticulating the polyurethane foam to remove substantially all foam cell membranes; and
   wherein said reticulated polyurethane foam absorbs and retains ink.

2. The ink retainer of claim 1, further comprising (c) felting the reticulated polyurethane foam.

3. The ink retainer of claim 1, wherein the polyisocyanate component includes a mixture of isocyanates, and toluene diisocyanate comprises no more than 17 percent by weight, based on the weight of the polyol.

4. The ink retainer of claim 1, wherein the isocyanate index is in the range of 103 to 120.

5. The ink retainer of claim 1, wherein less than 2.0% solvent extractables are extracted from the reticulated foam.

6. The ink retainer of claim 1, wherein less than 1.5% solvent extractables are extracted from the reticulated foam.

7. The ink retainer of claim 1, less than 1.1% solvent extractables are extracted from the reticulated foam.

8. The ink retainer of claim 1, wherein the reticulated polyurethane foam contains more than 70 pores per inch in an uncompressed state.

9. The ink retainer of claim 1, wherein the reticulated polyurethane foam is felted to achieve a compression ratio by volume in the range of from 1 to 2 up to from 1 to 20.

10. The ink retainer of claim 1, wherein the reticulated polyurethane foam is felted to achieve a compression ratio by volume in the range of from 1 to 5.

* * * * *